United States Patent
Laughlin et al.

(10) Patent No.: US 11,633,729 B2
(45) Date of Patent: Apr. 25, 2023

(54) PARTICLES WITH RADIAL VARIATION

(71) Applicant: DDP Specialty Electronic Materials US 5, LLC., Wilmington, DE (US)

(72) Inventors: Kenneth Laughlin, Maple Glen, PA (US); Alfred K. Schultz, Maple Glen, PA (US); John Reffner, North Wales, PA (US); Oscar David Redwine, Coleman, MI (US); Robert L. Sammler, Midland, MI (US); Andrew M. Savo, Cherry Hill, NJ (US)

(73) Assignee: DDP SPECIALTY ELECTRONIC MATERIALS US 5, LLC, Wilmington, DE (US)

( * ) Notice: Subject to any disclaimer, the term of this patent is extended or adjusted under 35 U.S.C. 154(b) by 167 days.

(21) Appl. No.: 16/648,142

(22) PCT Filed: Sep. 25, 2018

(86) PCT No.: PCT/US2018/052513
§ 371 (c)(1),
(2) Date: Mar. 17, 2020

(87) PCT Pub. No.: WO2019/067377
PCT Pub. Date: Apr. 4, 2019

(65) Prior Publication Data
US 2020/0216590 A1 Jul. 9, 2020

Related U.S. Application Data

(60) Provisional application No. 62/565,423, filed on Sep. 29, 2017.

(51) Int. Cl.
*B01J 39/20* (2006.01)
*C08F 212/08* (2006.01)
(Continued)

(52) U.S. Cl.
CPC ............ *B01J 39/20* (2013.01); *C08F 212/08* (2013.01); *C08L 25/06* (2013.01); *C08L 2207/53* (2013.01)

(58) Field of Classification Search
USPC .................................................. 526/78, 930
See application file for complete search history.

(56) References Cited

U.S. PATENT DOCUMENTS

| 4,444,960 A | 4/1984 | Salee et al. |
| 4,623,706 A | 11/1986 | Timm et al. |
| (Continued) | | |

FOREIGN PATENT DOCUMENTS

| EP | 0101943 A2 | 7/1983 |
| WO | 2013052363 A2 | 4/2013 |
| WO | 2016025550 A1 | 2/2016 |

OTHER PUBLICATIONS

Polyvinyl Alcohol (PVA) Chemical and Technical Assessment (CTA), S.K.Saxena, pp. 1-3 (Copyright 2004). (Year: 2004).*
(Continued)

*Primary Examiner* — Fred M Teskin (57) ABSTRACT

A polymeric bead having radius R wherein the polymer comprises 0.3% to 20% by weight, based on the weight of the polymer, of polymerized units of one or more multifunctional vinyl monomer and 80% to 99.7% by weight, based on the weight of the polymer, of polymerized units of one or more monofunctional vinyl monomer,
(a) wherein the polymerized units of multifunctional vinyl monomer have radial distribution factor MR of 0.9 to 1.1,
and
(b) wherein some of the vinyl groups in the polymerized units of multivinyl monomer are unreacted, and the unreacted vinyl groups have a radial distribution factor VR of 2.5 or higher.

16 Claims, 4 Drawing Sheets

(51) Int. Cl.
*C08F 212/36* (2006.01)
*C08L 25/06* (2006.01)

(56) References Cited

U.S. PATENT DOCUMENTS

| | | | |
|---|---|---|---|
| 5,278,193 | A | 1/1994 | Eiffler et al. |
| 6,251,314 | B1 | 6/2001 | Halle et al. |
| 2009/0292033 | A1 | 11/2009 | Matsumura et al. |
| 2013/0085190 | A1* | 4/2013 | Sochilin .................. B01J 49/57 521/32 |

OTHER PUBLICATIONS

Luka, Martin, International Search Report for PCT/US2018/052513, dated Dec. 10, 2018, pp. 1-4, European Patent Office.

Luka, Martin, Written Opinion of the International Searching Authority for PCTUS2018/052513, dated Dec. 10, 2018, pp. 1-5, European Patent Office.

Jasso-Gastinel et al, Synthesis and Characterization of Anionic Exchange Resins with a Gradient in Polymer Composition for the PS-co-DVB/PDEAMA-co-DVB System, Polymer Bulletin 59, 777-785, 2008.

Ogino et al, NMR Analysis of Internaction Between Styrene-Divinylbenzene Gel Beads and Small Molecules, Journal of Polymer Science; Part B: Polymer Physiscs, vol. 33, 189-195 (1995).

O'Conner et al., H NMR Characterization of Swelling in cross-Linked Polymer Systems, Macromolecules, 1996, 29, 7872-7884.

\* cited by examiner

PARTICLES WITH RADIAL VARIATION

CROSS-REFERENCE TO RELATED APPLICATIONS

This application is a national phase application of PCT Application No. PCT/US2018/052513, filed Sep. 25, 2018, which claims priority to U.S. Provisional Application No. 62/565,423, filed Sep. 29, 2017. Both applications are incorporated into this application by reference in their entireties.

Polymeric ion exchange resins in the form of beads are used in many applications, including, for example, as chelating resins or as anion exchangers or as cation exchangers. In many of these applications, the resins are subjected to stresses which can cause substantial breakage of the beads. These stresses may be mechanical, for example due to crushing or collisions between beads or between the beads and their containers; or may be osmotic, such as when the beads are subjected to sudden and/or repeated changes in electrolyte concentration. The breakage of the ion exchange beads in a column causes one or more of the following problems: substantial losses in the efficiency of the column; rise in pressure drop through the column; and contamination of the product stream. Any of these problems will cause large costs in replacing the broken resins.

Ion exchange resins are either gel type or macroporous type. In some cases, gel type (microporous) resins have poor osmotic properties. As a result, macroporous type resins are generally employed when good osmotic properties are essential. However, macroporous resins often have poor mechanical properties and often have substantially lower ion exchange capacity than gel type resins. It would be desirable to provide a gel type ion exchange resin having one or more of the following: good osmotic properties, good mechanical properties, and high ion exchange capacity.

One approach to making gel type resins is described in EP 0 101 943, which describes methods in which a polymeric matrix that contains radicals is contacted with a monomer feed to make core/shell beads. This is a complex process in which a radical-containing polymer must be made, and then monomer must be fed into the container that has the radical-containing polymer. Additionally, the process described in EP 0 101 943 is most advantageous when the concentration of polymerized units of multifunctional vinyl monomer in the shell is lower than the concentration of polymerized units of multifunctional vinyl monomer in the core. It would be desirable to provide high-strength gel type resins with a process that did not require a separate monomer-feeding step. It would also be desirable to provide a high-strength gel type resin in which the concentration of polymerized units of multifunctional vinyl monomer was the same or nearly the same throughout the resin.

The following is a statement of the invention.

A first aspect of the present invention is a process of making polymeric beads comprising
(a) providing a suspension of monomer droplets in an aqueous medium at pH of 7 or less,
  wherein the monomer droplets comprise one or more monofunctional vinyl monomers, one or more multifunctional vinyl monomers, and one or more initiators,
  wherein the aqueous medium comprises one or more derivatives of a nitrite salt in an amount, by weight based on the weight of the aqueous medium, of 0.005% to 0.5%, and
(b) initiating polymerization of the monomer,
  wherein no pH-raising substance is added after beginning step (b) until 60% or more by weight of all monofunctional monomer has been converted to polymer.

A second aspect of the present invention is a polymeric bead having radius R wherein the polymer comprises 0.3% to 20% by weight, based on the weight of the polymer, of polymerized units of one or more multifunctional vinyl monomer and 80% to 99.7% by weight, based on the weight of the polymer, of polymerized units of one or more monofunctional vinyl monomer,
  (a) wherein the polymerized units of multifunctional vinyl monomer have radial distribution factor MR of 0.9 to 1.1, wherein MR=CMSHELL/CMCORE, wherein CMSHELL is the average concentration of polymerized units of multifunctional vinyl monomer located at a distance from the center of the bead of 0.8*R to R, and wherein CMCORE is the average concentration of polymerized units of multifunctional vinyl monomer located at a distance from the center of the bead of 0 to 0.5*R,
  and
  (b) wherein some of the vinyl groups in the polymerized units of multivinyl monomer are unreacted, and the unreacted vinyl groups have a radial distribution factor VR of 2.5 or higher, wherein VR is determined by a Raman spectroscopic measurement performed on the bead, wherein $$VR = V1SHELL/V1CORE,$$

wherein V1SHELL is the average of ratio V1 for measurements made at a distance from the center of the bead of 0.8*R to R, wherein V1CORE is the average of ratio V1 for measurements made at a distance from the center of the bead of 0 to 0.5*R, wherein V1=PCC/PAR, wherein PCC is the height of the Raman spectroscopic peak due to stretching of carbon-carbon double bonds, and PAR is the height of the Raman spectroscopic reference peak due to stretching of the aromatic ring at 1000 $cm^{-1}$.

The following is a brief description of the drawings.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer.

Vinyl monomers have the structure where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

Styrenic monomers are vinyl monomers in which each of $R^1$ and $R^2$ is hydrogen, $R^3$ is hydrogen or alkyl, and —$R^4$ has the structure where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

Acrylic monomers are vinyl monomers in which each of $R^1$ and $R^2$ is hydrogen; $R^3$ is either hydrogen or methyl; and —$R^4$ has one of the following structures:

where each of $R^{11}$, $R^{12}$, and $R^{14}$ is, independently, hydrogen, a $C_1$ to $C_{14}$ alkyl group, or a substituted $C_1$ to $C_{14}$ alkyl group.

A reaction among monomers to form one or more polymers is referred to herein as a polymerization process. A polymerization process is said herein to have run to completion when the amount of unreacted monomer in the vessel in which the polymerization process is taking place is 5 mass % or less, based on the sum of the mass of unreacted monomer and the mass of polymer made in the polymerization process.

As used herein, an inhibitor is a molecule that interacts with a free radical to create a moiety (herein the "dead-end" moiety) that is not susceptible to free radical polymerization. The inhibitor may interact with a free radical to form the dead-end moiety directly, or the inhibitor may first form one or more intermediates, and the intermediate may interact with a radical to form a dead-end moiety. In cases where the inhibitor first forms an intermediate, the formation of the intermediate may occur through a reaction between the inhibitor and a free radical.

As used herein, an initiator is a molecule that is stable at ambient conditions but that is capable under certain conditions of producing one or more fragments that bears a free radical, and that fragment is capable of interacting with a monomer to start a free radical polymerization process. The conditions that cause production of a fragment bearing a free radical include, for example, elevated temperature, participation in an oxidation-reduction reaction, exposure to ultraviolet and/or ionizing radiation, or a combination thereof.

A porogen is a compound that is soluble in the monomer or mixture of monomers used in the practice of the present invention. That is, at 25° C., 100 grams or more of porogen will dissolve in 100 grams of monomer or mixture of monomers used in the practice of the present invention. The polymer does not imbibe large amounts of porogen. That is, at 25° C., the polymer formed in the practice of the present invention imbibes 5 grams or less of porogen per 100 grams of polymer.

Macroporous polymeric beads have a porous structure with average pore diameter of 20 nm or larger. Pore diameter is measured using the Brunauer-Emmett-Teller (BET) method using nitrogen gas. Macroporous polymeric beads are normally made by incorporating a porogen into monomer droplets. The porogen is soluble in the monomer, but the polymer does not dissolve in the porogen, so that as the polymer forms, phase-separated domains of porogen remain. After polymerization, the porogen is removed by evaporation or by washing with solvent. The porous structure of the polymeric bead is the empty space left when the porogen is removed from its phase-separated domains.

Gel type polymeric beads are made without the use of porogen. The pores in gel type polymeric beads are the free volumes between the atoms in the entangled, crosslinked polymer chains of the polymeric bead. The pores in gel type polymeric beads are smaller than 20 nm. In some cases, the pores in gel type resins are too small to be detected using the BET method.

As used herein, ion exchange is a process in which ions in solution become attached to a solid resin (an ion exchange resin), and those ions are exchanged for ions of the same type of charge that are released by the ion exchange resin. Functional groups located on the resin have opposite charge to the ions being exchanged, and those functional groups are known herein as ion exchange groups.

A compound is said herein to be water-soluble if 5 grams or more of the compound forms a stable solution in 100 ml of water at 25° C. In the case of some water-soluble polymers, the water may need to be heated above 25° C. in order to make the polymer dissolve, but after cooling to 25° C., the solution is stable when held at 25° C.

As used herein, a base compound is a compound that has the ability to accept a proton to form the conjugate acid of that compound, and the conjugate acid of that compound has pKa of 9 or greater. As used herein, an acid compound is a compound that has the ability to release a proton, and the compound has pKa of 5 or less. A buffer is either (i) a compound that has the ability to accept a proton to form the conjugate acid of that compound, and the conjugate acid of that compound has pKa of less than 9, or (ii) a compound that has the ability to release a proton, and the compound has pKa of greater than 5.

As used herein, "ambient conditions" means temperature of approximately 25° C. and pressure of 1 atmosphere.

A suspension is a composition that has particles of one substance distributed through a liquid medium. The distributed particles may be liquid or solid; distributed liquid particles are called droplets. The medium is "aqueous" if the medium contains 90% or more water by weight, based on the weight of the medium. A suspension may or may not be stable. That is, the distributed particles may or may not have a tendency to settle to the bottom of the container or to float to the top of the container, and mechanical agitation may or may not be required to keep the particles distributed in the medium.

A polymeric bead is a particle that contains 90% or more by weight, based on the weight of the particle, organic polymer. A polymeric bead is spherical or nearly spherical. A polymeric bead is characterized by its radius. If the bead is not spherical, the radius of the bead is taken herein to be the radius of a "reference sphere," which is the imaginary sphere that has the same volume as the bead. Whether a particle is spherical or not is assessed by the "sphericity," represented by the Greek letter $\Psi$. Sphericity is defined by the following formula, based on the three principal axes of the bead, a (longest), b (middle), and c (shortest):

$$\Psi = \left(\frac{bc}{a^2}\right)^{(1/3)}$$

As used herein, a polymerization process is a "single-step" polymerization process when monomer and optionally other compounds are placed into a container, then the polymerization is initiated, and polymerization proceeds to completeness without the addition of any further monomer after the initiation of polymerization. A single-step polymerization process is not a seeded process.

As used herein, a suspension polymerization process is a "seeded" process if the process involves a state (S1) in which the monomer droplets contain 80% or more monomer by weight based on the weight of the droplets; in which the monomer droplets are not undergoing polymerization; and in which the monomer droplets contain polymer in an amount of 1% or more by weight based on the weight of the droplets. In a seeded process, after state (S1), polymerization of the monomer in the monomer droplets is initiated. In a typical seeded process, a suspension of polymeric particles is provided, then monomer is added to the suspension, the monomer imbibes into the polymeric particles, and then polymerization of monomer is initiated.

Ratios are described herein as follows. For example, if a ratio is said to be 3:1 or greater, that ratio may be 3:1 or 5:1 or 100:1 but may not be 2:1. The general statement of this idea is as follows: when a ratio is said herein to be X:1 or greater, it is meant that the ratio is Y:1, where Y is greater than or equal to X. Similarly, for example, if a ratio is said to be 15:1 or less, that ratio may be 15:1 or 10:1 or 0.1:1 but may not be 20:1. Stated in a general way: when a ratio is said herein to be W:1 or less, it is meant that the ratio is Z:1, where Z is less than or equal to W.

While the present invention is not limited to any specific theory, it is contemplated that the process of the present invention produces a polymeric bead that has a relatively constant concentration of polymerized units of multifunctional vinyl monomer throughout the volume of the bead. A molecule of multifunctional vinyl monomer becomes a polymerized unit when one or more of the polymerizable functional groups participates in a polymerization reaction. There are instances in which a polymerized unit of a multifunctional vinyl monomer retains one or more unreacted functional group. It is contemplated that in the present invention, while the polymerized units of multifunctional vinyl monomer are evenly distributed through the bead, the unreacted functional groups attached to such polymerized units are more prevalent in the shell portion of the bead than in the core portion. It is considered that the density of crosslink points in the polymeric bead is higher in the core than in the shell, because more of the functional groups of the multifunctional vinyl monomer have reacted in the shell to create more crosslink points. Thus it is considered that there is a lower density of crosslinks in the shell, even though the distribution of polymerized units of multifunctional vinyl monomer is approximately the same in the core and the shell.

The process of the present invention involves monomer droplets that contain vinyl monomer and initiator. The monomer droplets optionally additionally contain porogen.

It is useful to characterize the sum of the amount of monomer plus the amount of porogen, as a percentage by weight based on the weight of the monomer droplets. Preferably, that sum is 95% or higher; more preferably 97% or higher; more preferably 99% or higher.

Preferably, porogen is either absent or, if present, is present in relatively small amounts. If porogen is present in the monomer droplets, preferably the amount of porogen is limited to an amount, by weight based on the weight of the monomer droplets, of 10% or less; more preferably 3% or less; more preferably 1% or less; more preferably 0.3% or less. More preferably, no porogen is present in the monomer droplets.

Preferably, the amount of monomer in the monomer droplets is, by weight based on the weight of the droplets, 95% or more; more preferably 97% or more; more preferably 99% or more.

Preferred vinyl monomers are styrenic monomers, acrylic monomers, and mixtures thereof. Preferably, all the monomers used are selected from styrenic monomers, acrylic monomers, and mixtures thereof. More preferably, all the monomers used are selected from styrenic monomers. The vinyl monomer includes one or more monofunctional vinyl monomer. Preferred monofunctional vinyl monomers are acrylic and styrenic monofunctional monomers; more preferred are monofunctional styrenic monomers; more preferred is styrene. The vinyl monomer also includes one or more multifunctional vinyl monomer. Preferred multifunctional vinyl monomers are multifunctional styrenic monomers; more preferred is divinyl benzene. As used herein, the term "divinyl benzene" or "DVB" refers to a mixture containing approximately 63% pure chemical DVB by weight and approximately 37% ethylvinyl benzene by weight, possibly with other chemicals in a total amount of 1% or less. Preferably, the amount of vinyl chloride is, by weight based on the total weight of all monomers, 0 to 0.1%, more preferably 0 to 0.01%; more preferably 0%.

Preferably, the amount of styrenic monomer, by weight based on the weight of all monomers, is 50% or higher; more preferably 75% or higher; more preferably 88% or higher; more preferably 94% or higher; more preferably 97% or higher; more preferably 100%.

Preferably, the amount of monofunctional vinyl monomer is, by weight based on the weight of all monomers, 80% or more; more preferably 85% or more. Preferably, the amount of monofunctional vinyl monomer is, by weight based on the weight of all monomers, 99.7% or less; more preferably 99% or less; more preferably 98% or less; more preferably 96% or less; more preferably 94% or less; more preferably 92% or less.

Preferably, the amount of multifunctional vinyl monomer is, by weight based on the weight of all monomers, 0.3% or more; more preferably 1% or more; more preferably 2% or more; more preferably 4% or more; more preferably 6% or more; more preferably 8% or more. Preferably, the amount of multifunctional vinyl monomer is, by weight based on the weight of all monomers, 20% or less; more preferably 15% or less.

Preferably, the monomer droplets contain little or no polymer prior to initiation of polymerization. The amount of polymer is, by weight based on the weight of the monomer droplets, preferably 1% or less; more preferably 0.3% or less; more preferably 0.1% or less; more preferably zero.

The process of the present invention involves a suspension of the monomer droplets in an aqueous medium. Preferably, the total amount of monomer, by weight based on the total weight of the suspension, is 5% or more; more preferably 10% or more; more preferably 15% or more. Preferably, the total amount of monomer, by weight based on the total weight of the suspension, is 55% or less; more preferably 35% or less; more preferably 30% or less.

The aqueous medium contains one or more dissolved nitrite salts, the derivatives of that nitrite salt, or a combination thereof. A nitrite salt has the formula $M(NO_2)_v$, where M is ammonium or an alkali metal cation or an alkaline earth cation, v is 1 when M is ammonium or an alkali metal cation, and v is 2 when M is an alkaline earth cation. It is considered that when a nitrite salt is dissolved in water, the nitrite ion may undergo chemical reactions to form derivatives such as, for example, nitrous acid and/or compounds of the formula $N_xO_y$. The amount of these derivatives is characterized by the weight of the dissolved salt plus the amount of salt that would have to be dissolved in order to produce the amount of derivatives that are present in the aqueous medium. The preferred amount of nitrite salt and its derivatives is, by weight based on the weight of the aqueous medium, 0.005% or more; more preferably 0.008% or more; more preferably 0.011% or more; more preferably 0.014% or more. The preferred amount of nitrite salt and its derivatives is, by weight based on the weight of the aqueous medium, 0.5% or less; more preferably 0.4% or less; more preferably 0.3% or less; more preferably 0.2% or less.

A preferred nitrite salt is sodium nitrite. Preferably the derivatives of nitrite salt are derivatives of sodium nitrite.

The monomer droplets preferably contain one or more initiator. Preferred initiators have solubility in 100 mL of water at 25° C. of 1 gram or less; more preferably 0.5 gram or less; more preferably 0.2 gram or less; more preferably 0.1 gram or less. Preferred are peroxide and hydroperoxide initiators; more preferred are peroxide initiators; more preferred are benzoyl peroxide and derivatives thereof; more preferred is benzoyl peroxide. Preferably, the weight ratio of initiator to total monomer is 0.001:1 or higher; more preferably 0.002:1 or higher. Preferably, the weight ratio of initiator to total monomer is 0.02:1 or lower; more preferably 0.01:1 or lower; more preferably 0.007:1 or lower.

The suspension preferably contains one or more water-soluble polymer. Preferred water-soluble polymers are water-soluble polyvinyl alcohol polymers, water-soluble derivatives of cellulose, and mixtures thereof. Among water-soluble derivatives of cellulose, preferred are carboxymethyl methylcelluloses. Among polyvinyl alcohol polymers, preferred are those with degree of hydrolysis of 80% to 90%. Preferably the suspension contains one or more water-soluble polyvinyl alcohol polymers and one or more water-soluble derivatives of cellulose.

When one or more water-soluble polymers are used, preferably the total amount of water-soluble polymers is, by weight based on the weight of the water, 0.02% or higher; more preferably 0.05% or higher; more preferably 0.1% or higher. When one or more water-soluble polymers are used, preferably the total amount of water-soluble polymers is, by weight based on the weight of the water, 1% or less; more preferably 0.5% or less.

Gelatin may or may not be present in the suspension. When gelatin is present, the amount is, by weight based on the weight of the water, 2% or less; or 1% or less; or 0.5% or less. Preferred embodiments have little or no gelatin. Preferably the amount of gelatin is sufficiently low that the amount of gelatin is, by weight based on the weight of water, 0 to 0.01%; more preferably 0 to 0.001%. More preferably the amount of gelatin is zero.

Prior to the step (b) of initiating polymerization of monomer, the pH of the aqueous medium is 7 or lower. Prior to the step (b) of initiating polymerization of monomer, the pH of the aqueous medium is preferably 3 or higher; more preferably 4 or higher, more preferably 5 or higher; more preferably 5.5 or higher.

While the present invention is not limited to any specific theory or mechanism, the following is contemplated regarding the operation of the present invention. It is considered that, when water-soluble nitrite salt is added to the suspension, some or all of the water-soluble nitrite salt dissolves in the water in the aqueous medium, and that, at pH of 7 or below, the presence of hydrogen ions creates an equilibrium between dissolved nitrite ion and nitrous acid. The nitrous acid is thought to undergo further chemical reactions to form one or more of nitrogen monoxide or other compounds of formula NxOy, where x is 1 or 2, y is 1 to 5, and when x is 2, y is 1, 3, 4, or 5. In general, it is expected that the lower the pH, the greater the production of compounds of formula NxOy, including NO. It is considered that the most likely NxOy compound to be produced is nitrogen monoxide (NO), possibly in combination with one or more other NxOy compound. A compound of formula NxOy that is formed when a water soluble nitrite salt is added to the suspension is considered herein to be a derivative of the water soluble nitrite salt. It is contemplated that because NO is a radical species, NO will act as an inhibitor by reacting with a monomer radical or with a radical on a growing polymer chain, thus terminating the polymerization reaction. It is contemplated that other NxOy compounds may also act as inhibitors.

It is contemplated that the presence of dissolved nitrite ion and the acidic conditions in the aqueous medium create a system in which fresh inhibitor molecules are constantly being formed throughout the polymerization process, as long as the pH is kept below 7. It is contemplated that benefits similar to those obtained by the present invention could also be obtained by gradually adding an inhibitor (such as, for example, catechol) to the aqueous medium. Such a procedure would also create a system in which fresh inhibitor molecules were constantly introduced. Whatever inhibitor is used, it is contemplated that the inhibitor should be partly or fully soluble in water to allow for transportation through the aqueous medium and should be partly or fully soluble in the monomer droplet to allow the inhibitor to diffuse into the monomer droplet, where it could react with a radical and terminate polymerization.

The pH of the suspension prior to the beginning of polymerization may optionally be established by addition of one or more acid to the aqueous medium. When an acid is added, preferred acids have first pKa of 3 or higher; more preferably 4 or higher. When an acid is used, any type of acid may be used; preferred are organic acids. Preferably, no acid is added to the aqueous medium; that is, it is preferred that the ingredients listed above establish a pH in the suspension that is 7 or lower without the addition of acid. Preferably, no buffer is present in the aqueous medium.

The nature of the step that initiates polymerization depends in part on the nature of the initiator that is used. For example, when a thermal initiator is used, initiation conditions involve establishing a temperature above 25° C. that is high enough for a significant fraction of the initiator molecules to decompose to form free radicals. For another example, if a photoinitiator is used, initiation conditions involve exposing the initiator to radiation of sufficiently low wavelength and of sufficiently high intensity for a significant fraction of the initiator molecules to decompose to form free radicals. For another example, when the initiator is a redox initiator, initiation conditions involve the presence of sufficiently high concentration of both the oxidant and the reductant such that a significant number of free radicals are produced. Preferably, a thermal initiator is used. Preferably, initiation conditions involve temperature of 65° C. or higher; more preferably 75° C. or higher. That is, preferably the suspension is provided at a temperature below 40° C., and the initiator that is present does not produce significant number of free radicals at that temperature. Then, preferably, step (b) involves raising the temperature to initiation conditions.

After step (b), while polymerization is taking place, at any moment, the extent of the free radical polymerization in the vessel that contains the suspension may be characterized as follows.

$$\text{Extent}=100*PM/TM$$

where PM is the mass of polymer formed by the free radical polymerization process, and TM is the total mass of monomer that has been added to the vessel.

In some embodiments a base or an appropriate buffer may be added to the suspension during the polymerization. An appropriate buffer is a buffer that would raise the pH of the suspension. One motivation for adding a base or an appropriate buffer is that it is considered that raising the pH of the suspension may cause some of the derivatives of the nitrite salt to react to re-form the nitrite salt. Because some of the derivatives, especially one or more of the $N_xO_y$ compounds, are considered to inhibit polymerization, raising the pH is considered to remove some inhibitors from the suspension, which is considered to allow the polymerization to reach completion more quickly. In the practice of the present invention, if a base or an appropriate buffer is added, it is not added at any time from the first initialization of polymerization to the point when the extent of the reaction is at 60% or higher; preferably 70% or higher; preferably 80% or higher. In some embodiments, no base or appropriate buffer is added to the suspension during the polymerization.

When a base is added, preferred are organic base compounds and inorganic base compounds. More preferred are inorganic base compounds; more preferred are alkali hydroxides and ammonium hydroxide; more preferred are alkali hydroxides. Preferably, when base compound is added to the suspension, the addition is performed by first forming an aqueous solution of a base compound and then adding that solution to the suspension. Preferred aqueous solutions have concentration of base compound, by weight based on the weight of the solution, of 1% or more; more preferably 2% or more; more preferably 5% or more. Preferred aqueous solutions have concentration of base compound, by weight based on the weight of the solution, of 50% or less; more preferably 25% or less; more preferably 15% or less; more preferably 10% or less.

When an appropriate buffer is added, preferably the buffer is a compound that has the ability to accept a proton to form the conjugate acid of that compound, and the conjugate acid of that compound has pKa that is less than 9. Preferably, the conjugate acid of that compound has pKa that is 6 or higher; more preferably 7 or higher; more preferably 7.5 or higher. Some suitable buffers include, for example, TES (2-[[1,3-dihydroxy-2-(hydroxymethyl)propan-2-yl]amino]ethanesulfonic acid); HEPES (4-(2-hydroxyethyl)-1-piperazineethanesulfonic acid); DIPSO (3-(N,N-Bis[2-hydroxyethyl]amino)-2-hydroxypropanesulfonic acid, N,N-Bis(2-hydroxyethyl)-3-amino-2-hydroxypropanesulfonic acid); TAPSO (2-Hydroxy-3-[tris(hydroxymethyl)methylamino]-1-propanesulfonic acid, N-[Tris(hydroxymethyl)methyl]-3-amino-2-hydroxypropanesulfonic acid); triethanolamine; N-ethyl morpholine; POPSO (2-Hydroxy-3-[tris(hydroxymethyl)methylamino]-1-propanesulfonic acid, N-[Tris(hydroxymethyl)methyl]-3-amino-2-hydroxypropanesulfonic acid"; EPPS, also known as HEPPS (4-(2-Hydroxyethyl)-1-piperazinepropanesulfonic acid, 4-(2-Hydroxyethyl)piperazine-1-propanesulfonic acid, N-(2-Hydroxyethyl)piperazine-N'-(3-propanesulfonic acid)); HEPPSO (CAS number 865856-46-8); TRIS (2-Amino-2-hydroxymethyl-propane-1,3-diol); tricine; glycylglycine; bicene; TAPS (N-[Tris(hydroxymethyl)methyl]-3-aminopropanesulfonic acid, [(2-Hydroxy-1,1-bis(hydroxymethyl) ethyl)amino]-1-propanesulfonic acid); morpholine; N-methyldiethanolamine; AMPO (2-amino-2-methyl-1,3-propanediol); diethanolamine.

The suspension may or may not contain boric acid. When boric acid is present, the amount may be, by weight based on the weight of water, 2% or less, or 1% or less, or 0.5% or less. Preferably, the suspension contains little or no boric acid. Preferably, the amount of boric acid in the suspension is 0 to 0.01% by weight, based on the weight of water; more preferably 0%.

Prior to the beginning of the polymerization process, droplets are present in the suspension, and the droplets contain vinyl monomer and initiator. Preferably the droplets are distributed throughout the aqueous medium, and preferably the composition of the aqueous medium contains water in the amount, by weight based on the weight of the continuous liquid medium, of 90% or more; more preferably 95% or more; more preferably 97% or more. Compounds dissolved in the water are considered to be part of the continuous liquid medium. Preferably, the volume average particle size of the droplets is 50 μm to 1,500 μm.

The suspension of monomer droplets is subjected to conditions that cause the initiator to initiate polymerization of the monomer. Preferably, the initiator is a thermal initiator, and the initiation of polymerization begins when the suspension is heated to a temperature that is above 40° C. and that is sufficiently high to cause enough initiator to produce enough radicals to initiate the polymerization.

Preferably, the polymerization is a single step polymerization. That is, preferably, either no monomer is added to the suspension after the initiation of polymerization or, if any monomer is added, the amount of monomer added is, by weight based on the weight of all monomers present in the suspension at the time of initiation of polymerization, 1% or less; more preferably 0.1% or less. More preferably, no monomer is added to the suspension after the initiation of polymerization.

Preferably, the process of the present invention is not a seeded process.

The present invention also involves polymeric beads. The polymeric beads are preferably made by the method of the present invention. Preferably, the polymeric beads contain polymer. Polymeric beads are particles that are solid at 25° C. and that contain polymer in the amount, by weight based on the weight of the polymeric particles, of 90% or more; more preferably 95% or more.

Preferably the polymeric beads have volume average particle diameter of 50 μm or larger; more preferably 100 μm or larger; more preferably 200 μm or larger; more preferably 400 μm or larger. Preferably the polymeric beads have volume average particle diameter of 1,500 μm or lower; more preferably 1,000 μm or lower.

Preferred polymers in the polymeric particles are the polymers formed by free radical polymerization of the preferred vinyl monomers described above. Preferably the polymer contains polymerized units of styrenic monomer in the amount, by weight based on the weight of the polymer, of 5% or more; more preferably 25% or more; more preferably 50% or more; more preferably 75% or more; more preferably 85% or more; more preferably 95% or more. The types of monomers preferred as polymerized units of the polymer are the same as those described above as preferred for use in the polymerization process.

Preferred polymers have polymerized units of multifunctional vinyl monomer in an amount, by weight based on the weight of the polymer, of 0.3% or more; more preferably 0.5% or more; more preferably 1% or more; more preferably 2% or more; more preferably 3% or more; more preferably 4% or more. Preferred polymers have polymerized units of multifunctional vinyl monomer in an amount, by weight based on the weight of the polymer, of 20% or less; more preferably 15% or less.

Preferred polymers have polymerized units of monofunctional vinyl monomer in an amount, by weight based on the weight of the polymer, of 99.7% or less; more preferably 99.5% or less; more preferably 99% or less; more preferably 98% or less; more preferably 97% or less; more preferably 96% or less. Preferred polymers have polymerized units of monofunctional vinyl monomer in an amount, by weight based on the weight of the polymer, of 80% or more; more preferably 85% or more.

It is contemplated that, when two or more of the vinyl groups on a single molecule of a multifunctional vinyl monomer participate in polymerization reactions, then that molecule forms a crosslink point between polymer chains. When considering the polymerized units of multifunctional vinyl monomers in the polymeric bead, it is contemplated that, in some but not all of such polymerized units, two or more of the vinyl groups will have participated in polymerization reactions and formed crosslink points. It is expected that sufficient crosslink points will have formed that the polymer in the polymeric bead will be a crosslinked polymer. At the same time, it is also contemplated that some polymerized units of multifunctional vinyl monomer will have one or more vinyl group that is unreacted (that is, a vinyl group that did not participate in a polymerization reaction and that is still intact).

Figure 1:
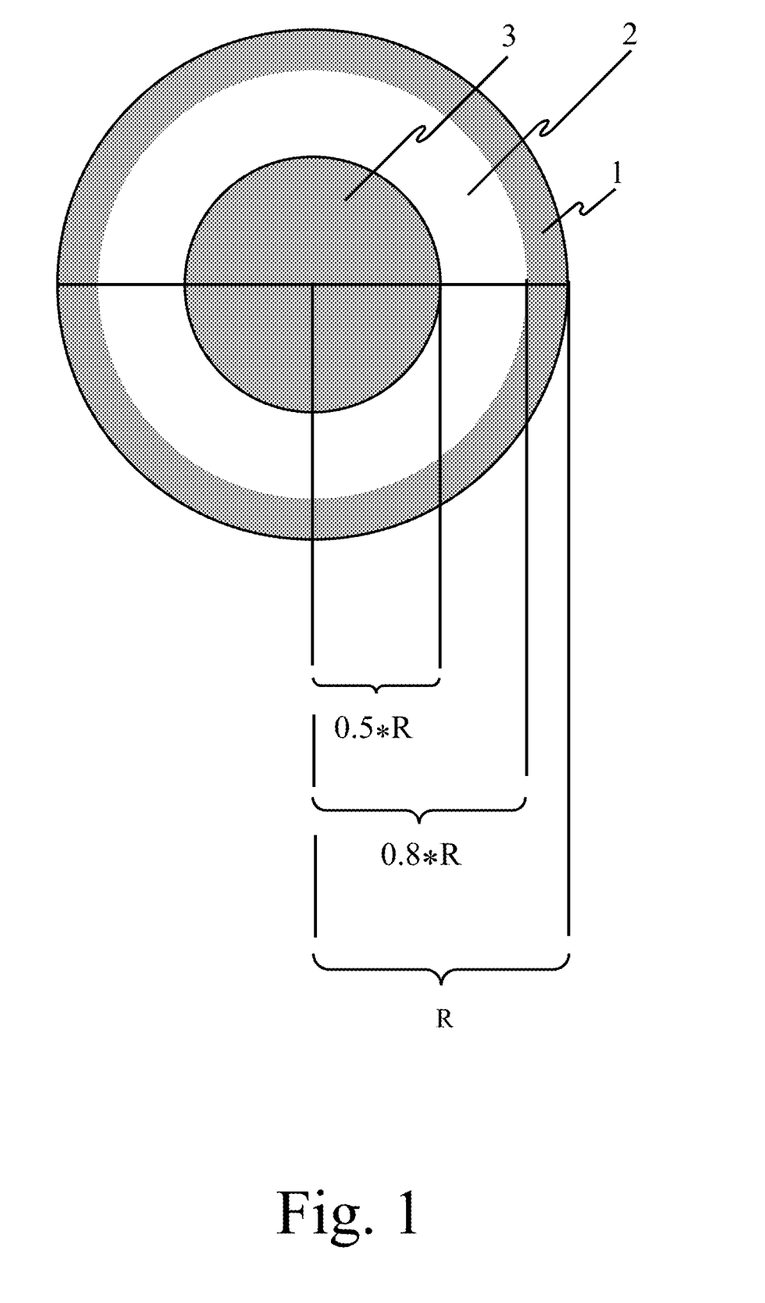
FIG. 1 shows a cross section of a polymeric bead.

The polymer in the polymeric bead has a relatively even distribution of polymerized units of multifunctional vinyl monomer between the central region of the bead and the outer shell of the bead. This distribution may be assessed as follows. The radius of the bead is defined as R. The shell is defined as the region of the bead located at a distance from the center of the bead of from 0.8*R to R. The core is defined as the region of the bead located at a distance from the center of the bead of from 0 to 0.5*R. The identification of the shell 1, the core 3, and an intermediate region 2 are illustrated in FIG. 1.

The concentration of polymerized units of multifunctional vinyl monomer located in the shell is labeled CMSHELL, and the concentration of polymerized units of multifunctional vinyl monomer located in the core is labeled CMCORE. The radial distribution factor, labeled MR, is defined as the quotient of CMSHELL divided by CMCORE:

$$MR = CMSHELL/CMCORE$$

CMCORE and CMSHELL may be characterized by any convenient units, for example millimole per cubic centimeter. In practice, because the quotient MR is the important quantity, the unit used for CMSHELL and CMCORE is not important, as long as the same unit is used for both CMSHELL and CMCORE.

The quotient MR is 0.9 or higher; preferably 0.95 or higher. The quotient MR is 1.1 or lower; more preferably 1.05 or lower.

The polymerized units of multifunctional vinyl monomer are distributed relatively evenly throughout the polymeric bead. However, in some polymerized units of multifunctional vinyl monomer, all of the vinyl groups participated in a polymerization reaction during the formation of the bead, while in other polymerized units of multifunctional vinyl monomer, at least one vinyl group did participate in a polymerization reaction during formation of the bead while at least one vinyl group remained unreacted. The spatial distribution of the unreacted vinyl groups is a characteristic of the present invention.

The distribution of unreacted vinyl groups is characterized as follows. The core and shell of the bead are defined as described above. A representative bead is cut open to reveal a cross section that includes the center of the bead. Raman spectroscopy is performed on microscopic regions of the bead. PCC is the height of the Raman peak at 1635 cm$^{-1}$ due to stretching of carbon-carbon double bonds. PAR is the height of the Raman reference peak at 1000 cm$^{-1}$ due to stretching of the aromatic ring. The quotient V1=PCC/PAR characterizes the prevalence of double bonds within the polymer. The quantity V1SHELL is the average of V1 in the shell, and the quantity V1CORE is the average of V1 in the core. For unreacted carbon-carbon double bonds, the radial distribution factor is VR=V1SHELL/V1CORE. When performing the Raman spectroscopy, the bead is optionally swollen in a solvent; the solvent is optionally fully deuterated.

It is considered that the accuracy of the above Raman spectroscopy method may be optimized by removing any residual unpolymerized monofunctional monomer from the polymeric bead, for example removing residual styrene by washing with acetone and drying the bead to remove the acetone. This washing step is considered especially useful when it is intended to perform the Raman spectroscopy on a bead that is not swollen in a solvent.

VR is 2.5 or higher, preferably 2.7 or higher; more preferably 2.9 or higher. Preferably, VR is 10 or lower; more preferably 5 or lower.

The polymeric beads preferably have average sphericity of 0.8 or higher; more preferably 0.85 or higher; more preferably 0.9 or higher; more preferably 0.95 or higher.

Another method of assessing the difference between the core region of the bead and the shell region of the bead is as follows. The core, the shell, and the quantity PAR are defined as above. The sample is swollen with fully deuterated toluene. It is considered that the shell region has lower concentration of crosslinks than the core region, and therefore the shell region is expected to imbibe more solvent in the swelling process. The quantity PCD is the height of the Raman peak at 2122 cm−1 due to stretching of carbon-deuterium bonds in the toluene. The quotient V2=PCD/PCH represents the prevalence of the deuterated toluene as compared to the polymer.

The quotient V2 can be converted to a mass-per-volume quotient (MPVQ) as follows. A reference solution of known concentration of linear polystyrene in deuterated toluene is made. For this reference solution, the mass per volume of deuterated toluene (MPVTOLREF) and the mass per volume of polystyrene (MPVPSREF) are both known, and the quotient is MPVQREF=MPVTOLREF/MPVPSREF. Also, the quotient for the reference solution is measured and labeled V2REF. Then, for any particular experimental sample, the quotient V2 can be converted to MPVQ as follows:

$$MPVQ=V2*MPVQREF/V2REF$$

In a bead swollen with deuterated toluene, the average value of MPVQ in the shell is MPVQSHELL, and the average value of MPVQ in the core is MPVQCORE. Then the radial distribution factor for solvent is RDFS=MPVQSHELL/MPVQCORE. Preferably, RDFS is 2.5 or greater. Preferably, RDFS is 10 or less.

Another method of showing the inhomogeneity of the bead uses nuclear magnetic resonance (NMR) spectroscopy. The analysis of the NMR results are based on the following preliminary observations. When chloroform ($CHCl_3$) is studied in a pure state, a characteristic chemical shift is observed in the NMR spectrum. When chloroform is studied in a blend with toluene, a change in the chemical shift of chloroform is observed, with a greater change observed at higher proportions of toluene in the blend. When chloroform is imbibed into a polymeric particle made of a polymerized units of styrenic monomer, the chemical shift of the chloroform is observed to shift in the same manner as was observed in the case of the blend of chloroform and toluene. The difference ("DIFF1") between the chemical shift of chloroform imbibed into the polymer and the chemical shift of pure chloroform is observed, and it is concluded that the larger that difference DIFF1 is, the greater the proportion of polymerized units of styrenic monomer are in the immediate region surrounding the chloroform molecule.

The inhomogeneity of a non-functionalized copolymer comprising polymerized units of styrenic monomers may be studied using NMR as follows. The polymeric bead is swollen with chloroform. In some samples, two different peaks are observed for chloroform, with each peak having its own chemical shift and therefore its own value of DIFF1. It is considered that each peak represents a different region within the bead. It is considered that the peak with larger DIFF1 represents chloroform molecules surrounded by a relatively larger proportion of polymerized units of styrenic monomer, indicating that relatively less chloroform has imbibed into that region of the particle, in turn indicating that that region has higher density of crosslink points. Similarly, it is considered that the peak with smaller DIFF1 represents chloroform molecules located in a region of relatively lower density of crosslink points.

The inhomogeneity of the polymeric bead may also be observed by microscopy. For example, optical microscopy and polarized light microscopy each show inhomogeneities that vary with the distance from the center of the particle.

A preferred use of the polymer produced in the free radical polymerization of the present invention is to be used in a conversion process to produce an ion exchange resin. Ion exchange resins fall into the following categories. Weak base anion exchange resins have pendant amino groups that are primary, secondary, or tertiary. Strong base anion exchange resins have pendant quaternary amino groups. Weak acid cation exchange resins have pendant carboxylic acid groups. Strong acid cation exchange resins have pendant sulfonic acid groups.

Typically, in the preparation of weak base anion exchange resins from polymeric beads such as crosslinked polystyrene beads, the beads are advantageously haloalkylated, preferably halomethylated, most preferably chloromethylated, and the ion active exchange groups subsequently attached to the haloalkylated copolymer. Typically, the haloalkylation reaction consists of swelling the crosslinked addition copolymer with haloalkylating agent, preferably bromomethylmethyl ether, chloromethylmethyl ether or a mixture of formaldehyde and hydrochloric acid, most preferably chloromethylmethyl ether and then reacting the copolymer and haloalkylating agent in the presence of a Friedel-Crafts catalyst such as zinc chloride, iron chloride, or aluminum chloride. Typically, a weak base anion exchange resin is prepared by contacting the haloalkylated copolymer with ammonia, a primary amine or a secondary amine. Typically, a strong base anion exchange resin is prepared by contacting the haloalkylated copolymer with a tertiary amine.

Typically, in the preparation of strong acid cation exchange resins from polymeric beads such as crosslinked polystyrene beads, the beads are advantageously sulfonated. Generally, the bead is swollen using a suitable swelling agent and the swollen bead reacted with a sulfonating agent such as sulfuric acid or chlorosulfonic acid or sulfur trioxide or a mixture thereof.

The inhomogeneous nature of the polymeric bead is preferably still present after sulfonation. This can be observed by NMR as described above except that the beads are swollen with water. As in the case of non-functionalized polymeric beads swollen with $CHCl_3$, the molecules of water that are imbibed into a functionalized bead of the present invention show two peaks, verifying that there are two different environments within the bead of different densities of crosslink points.

Preferably, when the polymeric bead is sulfonated, after the sulfonation process the polymeric bead has a relatively even distribution of sulfur between the central region of the bead and the outer shell of the bead. This distribution may be assessed as follows. The concentration of sulfur located in the shell is labeled CSSHELL, and the concentration of sulfur located in the core is labeled CSCORE. The radial distribution factor for sulfur, labeled RDFS, is defined as the quotient of CSSHELL divided by CSCORE:

$$RDFS=CSSHELL/CSCORE$$

CSCORE and CSSHELL may be characterized by any convenient units, for example millimole of sulfur per gram of polymer. In practice, because the quotient RDFS is the important quantity, the unit used for CSSHELL and CSCORE is not important, as long as the same unit is used for both CSSHELL and CSCORE. Further, a measurement could be made (such as, for example, a spectroscopic peak height) (labeled PHSSHELL) that was proportional to CSSHELL. That is, PHSSHELL=k*CSSSHELL, and the value of k may not be known. It is contemplated that the same measurement method could also produce a result (labeled PHSCORE) that was proportional to CSCORE; that is, PHSCORE=k*CSSHELL. As long as the proportionality constant k is the same for both measurements, then the RDFS can be measured even though k is unknown, because RDFS=PHSSHELL/PHSCORE.

The quotient RDFS is preferably 0.8 or higher; preferably 0.9 or higher, more preferably 0.95 or higher. The quotient RDFS is preferably 1.2 or lower; more preferably 1.1 or lower; more preferably 1.05 or lower.

It is contemplated that the polymeric beads of the present invention would be useful for a variety of purposes. Functionalized polymeric beads would be useful for many of the purposes where ion exchange resins are useful. Ion exchange resins having improved physical stability—high crush strength and low degree of breakdown in response to osmotic stress—would be valued by nearly all ion exchange resin end users. Such resins would be useful in a variety of end use applications, including, for example, water treatment, chromatography, and catalysis. For example, in the nuclear industry, there is a specification on crush strength for ion exchange resins used for water treatment that all suppliers must meet, and there is a competitive advantage to those who can supply resins having the highest possible crush strength.

For example, in water treatment in general, the degree of bead breakage on use-regeneration cycles (where the bead changes size due to the different ionic form/water content) will decrease. The reduced bead breakage will reduce the amount of fine particles mixed with the beads. This will improve resin lifetime and also efficiency and pressure drop for the end user.

In virtually any uses for ion exchange resins, resistance to mechanical stress (high crush strength) will minimize bead breakage that could results from the mass of beads in an industrial size column, or from the mechanical stress applied by pumps, pneumatic conveying systems, etc.

Functionalized polymeric beads made according to the present invention are preferably cation exchange resins.

For example, the degree of bead breakage on use-regeneration cycles (where the bead changes size due to the different ionic form/water content) will decrease. The reduced bead breakage will reduce the amount of fine particles mixed with the beads. This will improve resin lifetime, increase the efficiency of the resin operation, and reduce the pressure drop required to move fluid through a column of functionalized polymeric beads.

The following are examples of the present invention.

Raman spectroscopy was performed as follows. The Raman microscope detects signal from an hour-glass shaped volume. The beam diameter at the focal point is approximately 1 micrometer and the vertical resolution from the depth of field is approximately 5 to 10 micrometers. The laser was focused down into the sample to a depth of approximately 20 micrometers. The beads were swollen in deuterated toluene, which is a good solvent giving a high degree of swelling and good spectral resolution. A Renishaw™ RS-1000 instrument was used to measure the spectra, with a HeNe laser (25 mW, 633 nm), 600 g/mm grating, 1064-element TE-cooled CCD detector, and 100X ULWD (ultra-long working distance) objective. Spectra at different positions were measured manually by stepping across the bead diameter by moving the compression cell holding the bead.

The beads were swollen fully to equilibrium with the solvent over the course of the measurement. The beads were first equilibrated with a large excess of toluene-D8 (30 mg copolymer and 200 mg toluene-D8) in a vial for a few days at room temperature (approximately 23° C.), then removed from the solvent and cut in half with a razor blade. The flat surface was placed face down on the diamond window of a compression cell (Spectra-Tech™ and sealed with a Kalrez™ O-ring. The Kalrez™ O-ring swelled minimally in the toluene solvent. A few drops of toluene-D8 were added around the hemispherical bead so that it was soaked in solvent. The top of the diamond compression cell was then attached, and tightened until it just touched the round surface of the bead. The compression cell was flipped over for the Raman analysis so that the laser could be focused onto the surface of the bead exposed by the cut. The working distance of 6 mm of the ULWD objective was just sufficient for the experiment because of the distance between the stainless steel plate of the diamond compression cell and the copolymer sample.

Figure 2:
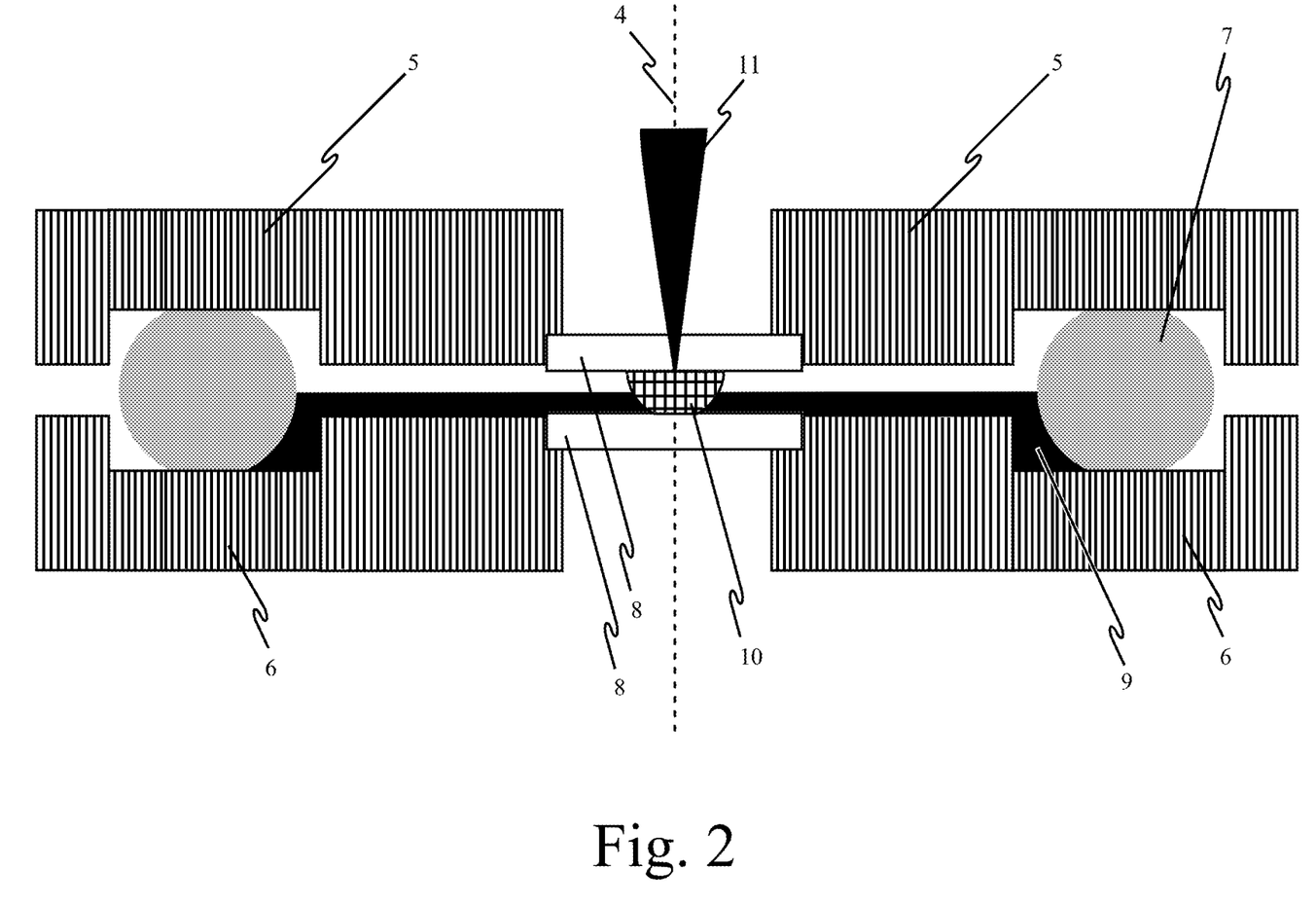
FIG. 2 shows a vertical cross section of apparatus for measuring Raman spectroscopy on a cross section of a swollen polymeric bead.

A diagram of the cell is shown in FIG. 2. The cell is a circular object, with circular symmetry around the axis 4. The top half 5 of the stainless steel structure and the bottom half 6 of the stainless steel structure together clamp the O-ring 7. The top half 2 of the stainless steel structure and the bottom half 3 of the stainless steel structure are held together by a mechanical arrangement (not shown). The diamond windows 8 are held in place in the stainless steel structure 5 and 6. The deuterated (D8) toluene 9 partially fills the space enclosed by the O-ring 7, the stainless steel structure 5 and 6, and the diamond windows 8. The sample 10 is a bead that is cut in half. The sample 10 is held in place between the diamond windows 8. The laser beam 11 is focused onto the sample 10.

Nuclear Magnetic Resonance (NMR) analysis was performed as described by P. J. O'Connor, et al., "1H NMR Characterization of Swelling in Cross-Linked Polymer Systems", *Macromolecules* Volume 29, Number 24, Pages 7872-7884, 1996; and by Kenji Ogino and Risa.ya Sato, "NMR Analysis of Interaction Between Styrene-Divinylbenzene Gel Beads and Small Molecules", Journal of Polymer Science, Vol. 33, 50 189-195, 1995.

Crush Strength was measured as follows. Functionalized polymeric beads were placed into contact with air at 100% humidity at 50° C. for 4 days. Then the beads were covered with deionized water and stored for one hour or more at room temperature (approximately 23° C.). A single bead was placed on one plate of a compression tester at room temperature, and the bead was covered with one drop of water. The plates are brought together at 6.0 mm/min until the particle fractures, and the peak force is noted. The procedure is repeated for at least 30 beads, and the average peak force is reported as the "crush strength." The test apparatus was a Chatillon™ force tester model TCD 200, with a medium-slow motor (2.5 to 63.5 mm/min). Force gauge was model DFGS10.

Osmotic stability (OS) was measured as follows. Functionalized polymeric beads were conditioned by contact with a 10% by weight solution of NaCl in water for 30 minutes at room temperature (approximately 23° C.). The NaCl solution was decanted, and the wet resin was passed through mesh screens to produce a sample of resins having diameter of 500 μm to 710 μm. Then 4 ml of the resin was placed in a vertical straight-walled glass column internal diameter 10 mm and length of at least 60 mm. All fluid, when put into the column, was pumped at 1 ml/sec. A single cycle was as follows: fluid drained from the column by gravity for 56 seconds; resin in the column was contacted with solution #1 for 60 seconds (4 seconds to fill the column, 32 seconds of solution #1 passing through the column, 4 seconds to fill the column, and 20 seconds of hold time with solution #1 static in the column); the fluid was drained from the column for 16 seconds, the column was backwashed with water for 10 seconds; static water was held in the column for 8 seconds; fluid drained from the column by gravity for 56 seconds; resin in the column was contacted with solution #2 for 60 seconds (4 seconds to fill the column, 32 seconds of solution #2 passing through the column, 4 seconds to fill the column, and 20 seconds of hold time with solution #2 static in the column); the fluid was drained from the column for 16 seconds, the column was backwashed with water for 10 seconds; static water was held in the column for 8 seconds. The test was repeated for 50 cycles. Solution #1 was 15% by weight H$_2$SO$_4$ in water. Solution #2 was 15% by weight NaOH in water. The cycles of exposure to different solutions causes some particles to break. After the cycles of exposure, the beads are placed on a screen (the "500 screen") that passes objects of diameter less than 500 µm. The material passing through the 500 screen is placed on a screen (the "150 screen") that passes objects of diameter less than 150 µm. The material retained on the 500 screen is considered whole beads; this material is dried at 105° C. for 16 hours or more, then cooled to approximately 23° C. in a desiccator, and then weighed; and the weight is reported as $W_{whole}$. The material retained on the 150 screen is considered fragments of beads; this material is dried at 105° C. for 16 hours or more, then cooled to approximately 23° C. in a desiccator, and then weighed; and the weight is reported as $W_{frag}$. The osmotic stability is $$OS(\%) = 100 \times W_{frag}/(W_{whole}+W_{frag}).$$

Lower OS values are more desirable.

Distribution of sulfur in sulfonated polymeric beads was measured as follows, using scanning electron microscopy with energy-dispersive x-ray spectroscopy (SEM-EDS). Scanning electron microscopy (SEM) images were collected with a Hitachi 3400 VP-SEM in variable pressure mode at 15 keV. EDX spectra were collected with a Thermo Noran System 6 EDS Spectrometer outfitted with an SDD detector. Radial concentration of S was measured as follows. Cross sections of the IER were prepared by fracturing with a scalpel; X-Ray spectral maps were collected for the cross sections from at least 4 beads; the net counts (background subtracted) signal for the characteristic X-Rays from the sulfur was extracted for a line profile through the center of the bead from the X-Ray spectral map; and the net counts were plotted as a function of radial distance.

The materials used in the following examples were as follows
Gelatin=animal based gelatin, isoelectric point approximately 8.5, commercial grade supplied by SOBEL NV (Rousselot)
PADMAC=solution in water (20% by weight) of poly(diallyldimethylammonium chloride), commercial grade supplied by NALCO
CMMC=carboxymethyl methylcellulose, manufactured by The Dow Chemical Company
PVOH=SELVOL™ 523 polyvinylalcohol, from Sekisui Specialty Chemicals
Tris=tris(hydroxymethyl)aminomethane, supplied by Fisher Scientific, 20% by weight solution in water
DVB=divinylbenzene (purity 63% by weight)
BPO=benzoyl peroxide (purity 75% by weight), supplied by Arkema
VPBA=4-vinylphenyl boronic acid, supplied by Beijing Pure Chemical
pbw=parts by weight
caustic=NaOH, 25% by weight solution in water Polymeric beads were made from approximately 90% styrene by weight and approximately 10% DVB by weight. Four different recipes were used for making polymeric beads. During the preparation of the suspension of monomer droplets, some individual ingredients or partial mixtures were, if necessary, temporarily heated to achieve good mixing, but the suspension of monomer droplets was provided at approximately 25° C. Monomer droplets were introduced in the aqueous medium by jetting, as described in U.S. Pat. Nos. 4,444,960 and 4,623,706. In all recipes, the weight ratio of droplet ingredients to aqueous phase ingredients was 0.61:1.

The recipes are summarized as follows. "Comp." means comparative. "Addition of Base" is the extent of conversion of monomer to polymer (approximate) at which base was added.

| Example | Replicate | Aqueous Phase | Addition of Base | pH at start | pH at end |
|---|---|---|---|---|---|
| Comp. 1 | A | Gelatin, PADMAC | none | 10.2 | 9.5 |
| Comp. 1 | B | Gelatin, PADMAC | none | 10.2 | 9.5 |
| Comp. 2 | A | CMMC only | 43% and 84% | 6.8 | 11.5 |
| Comp. 2 | B | CMMC, PVOH, VPBA | 40% and 83% | 6.4 | 10.4 |
| 3 | A | PVOH, VPBA | 82% | 6.0 | 7.5 |
| 3 | B | PVOH, VPBA | 82% | 6.0 | 7.5 |
| 4 | A | PVOH VPBA | none | 6.1 | 4.5 |
| 4 | B | PVOH VPBA | none | 6.1 | 4.7 |

Comparative Examples 1A and 1B did not begin polymerization at pH of 7 or less. Comparative Examples 2A and 2B had two additions of base that raised the pH, and one of these additions was made at monomer conversion of 43% and 40% (i.e., prior to 60%). The details of the methods of making the polymeric beads were as follows:

Comparatives Example 1A and 1B (Gelatin/PADMAC, high pH)

Droplet composition was as follows: (% by weight based on the total weight of droplet ingredients:

| Styrene | DVB | BPO |
|---|---|---|
| balance | 10.15% | 0.3% |

Aqueous medium composition was as follows (% by weight based on total weight of aqueous medium):

| DI Water | PADMAC | Gelatin | NaOH | Boric Acid | NaNO$_2$ |
|---|---|---|---|---|---|
| balance | 2.03% | 0.23% | 0.11% | 0.17% | 0.016% |

Aqueous suspension polymerization was conducted on the suspension of monomer droplets as follows. The suspension was heated to 72° C., and the extent of reaction was monitored. Once conversion to polymer was in the 80-85% range, the suspension was heated to 92° C. The pH began at 10.2 and finished at 9.5. After 1 hour, the suspension was cooled to ambient temperature and the beads were dewatered, washed with water, and dried at ambient temperature.

Sulfonation was performed as follows. 100 pbw of polymeric beads, 449 pbw of a solution of 96% by weight sulfuric acid in water, 5.2 parts by weight of DI water, and 35 pbw of EDC were added one by one to a reactor at ambient temperature, and heated to 130° C. over a 135 minute period. The system was held at 130° C. for 210 minutes, then cooled to 100° C. Once at 100° C., a hydration process was started, in order to remove acid and introduce water. The hydration was done in stages, using a 50% acid cut, a 25% acid cut, and then water. The hydration fluids are added at ambient temperature, so the batch temperature drifts from 100° C. to ambient temp over the course of the hydration. Following hydration, the water-swollen polymeric beads were washed with ambient temperature water, then with 98° C. water, then ambient water again. The excess water was filtered, isolating the water-swollen polymeric beads.

Duplicate samples were made, labeled 1A and 1B.

Comparative Example 2A (CMMC only; NaOH additions at 43% an 84%):

Droplet composition was as follows: (% by weight based on the total weight of droplet ingredients:

| Styrene | DVB | BPO |
|---|---|---|
| balance | 9.60% | 0.3% |

Aqueous medium composition was as follows (% by weight based on total weight of aqueous medium):

| DI Water | CMMC | NaNO$_2$ |
|---|---|---|
| balance | 0.15% | 0.016% |

Aqueous suspension polymerization was conducted as follows. The suspension was heated to 83° C. for 90 minutes and then cooled to 80° C. over a 10 minute period, and the extent of reaction was monitored. Caustic was added when the extent of reaction was in the 40-45% range, and when extent of reaction (conversion) was in the 80-85% range. Once conversion to polymer was in the 80-85% range, the reaction system was heated to 92° C. After 1 hour, the system was cooled to ambient temperature and the beads were dewatered, washed with water, and dried at ambient temperature. The polymeric beads were sulfonated using the same procedure as Comparative Example 1A.

Comparative Example 2B (CMMC/PVOH/VPBA; NaOH additions at 42% and 85% Conversion).

Monomer droplet composition was as follows: (% by weight based on the total weight of droplet ingredients):

| Styrene | DVB | VPBA | BPO |
|---|---|---|---|
| balance | 9.60% | 0.01% | 0.3% |

Aqueous medium composition was as follows (% by weight based on total weight of aqueous medium):

| DI Water | CMMC | PVOH | NaNO$_2$ |
|---|---|---|---|
| balance | 0.08% | 0.06% | 0.016% |

Aqueous suspension polymerization was conducted as follows. The suspension was heated to 83° C. for 90 minutes and then cooled to 80° C. over a 10 minute period, and the extent of reaction was monitored. Caustic was added when the extent of reaction was in the 40-45% range, and when extent of reaction (conversion) was in the 80-85% range. Once the extent of reaction was in the 80-85% range, the reaction system was heated to 97° C. After 1 hour, the system was cooled to ambient temperature, and the beads were dewatered, washed with water, and dried at ambient temperature. The polymeric beads were sulfonated using the same procedure as Comparative Example 1A.

Example 3A and 3B (PVOH/VPBA; Tris addition at 82% conversion).

Monomer droplet composition was the same as in Comparative Example 2B. The aqueous medium composition was as follows (weight % based on the weight of the aqueous composition):

| DI Water | PVOH | NaNO$_2$ |
|---|---|---|
| balance | 0.06% | 0.016% |

Aqueous suspension polymerization was conducted as follows. The suspension was heated to 83° C. for 90 minutes and then cooled to 80° C. over a 10 minute period, and the extent of reaction was monitored. Tris was added when extent of reaction (conversion) was in the 80-85% range. Once the extent of reaction was in the 80-85% range, the reaction system was heated to 97° C. After 1 hour, the system was cooled to ambient temperature and the beads were dewatered, washed with water and dried at ambient temperature. The polymeric beads were sulfonated using the same procedure as Comparative Example 1A. Duplicate samples were made, labeled 3A and 3B.

Example 4A (PVOH/VPBA; no pH adjustment).

Monomer droplet composition and aqueous medium composition were the same as in Example 3A. Aqueous suspension polymerization was conducted as follows. The suspension was heated to 83° C. for 90 minutes and then cooled to 80° C. over a 10 minute period, and the extent of reaction was monitored. Once the extent of reaction was in the 80-85% range, the reaction system was heated to 92° C. After 1 hour, the system was cooled to ambient temperature and the beads were dewatered, washed with water and dried at ambient temperature. The polymeric beads were sulfonated using the same procedure as Comparative Example 1A.

Example 4B (PVOH/VPBA; no pH adjustment).

Monomer droplet composition was as follows: (% by weight based on the total weight of droplet ingredients):

| Styrene | DVB | VPBA | BPO |
|---|---|---|---|
| balance | 9.60% | 0.01% | 0.3% |

The composition of the aqueous medium, the polymerization procedure, and the sulfonation procedure were the same as in Example 4A.

Results of Raman Spectroscopy of Polymeric Beads: C=C double bond stretching.

Figure 3:
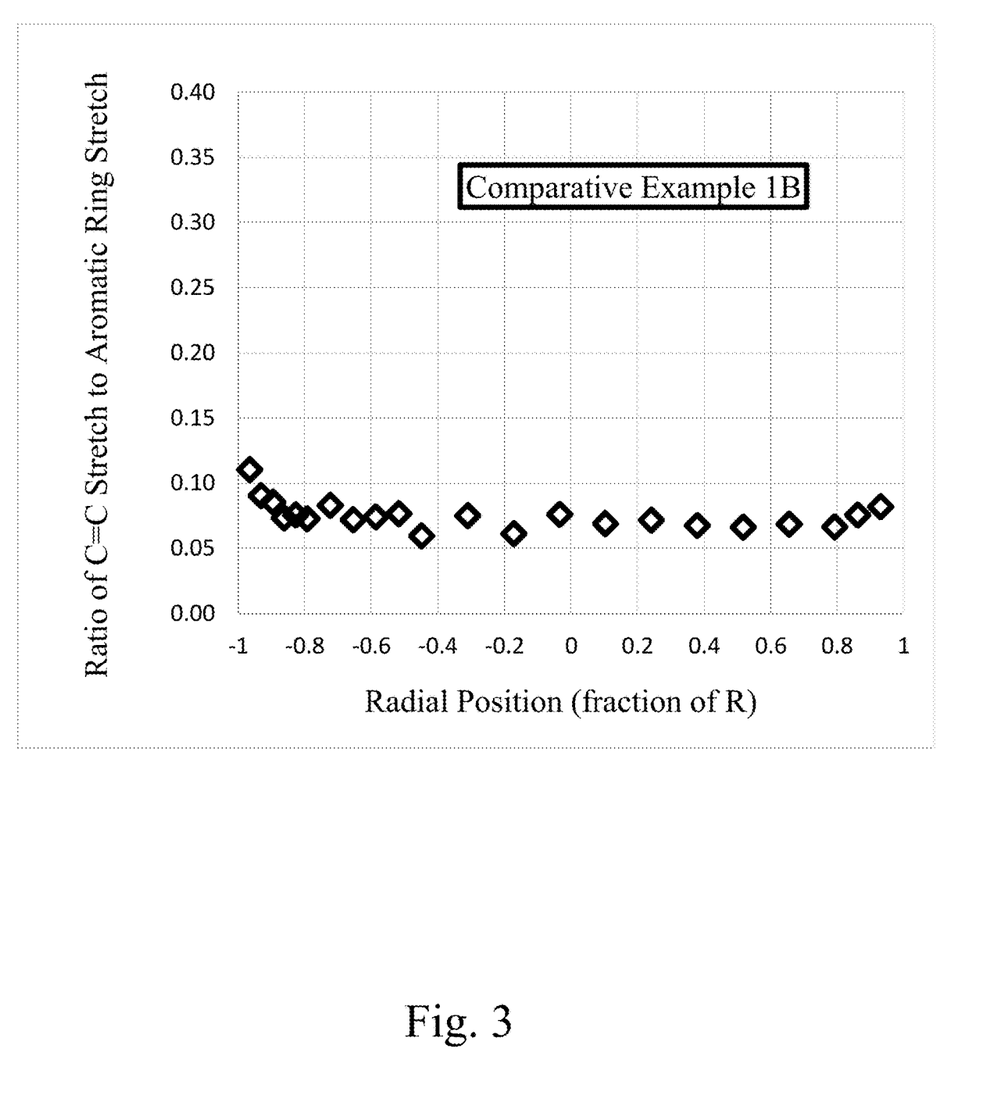
FIG. 3 shows the Raman spectroscopic analysis of a polymeric particle according to comparative Example 1B.
Figure 4:
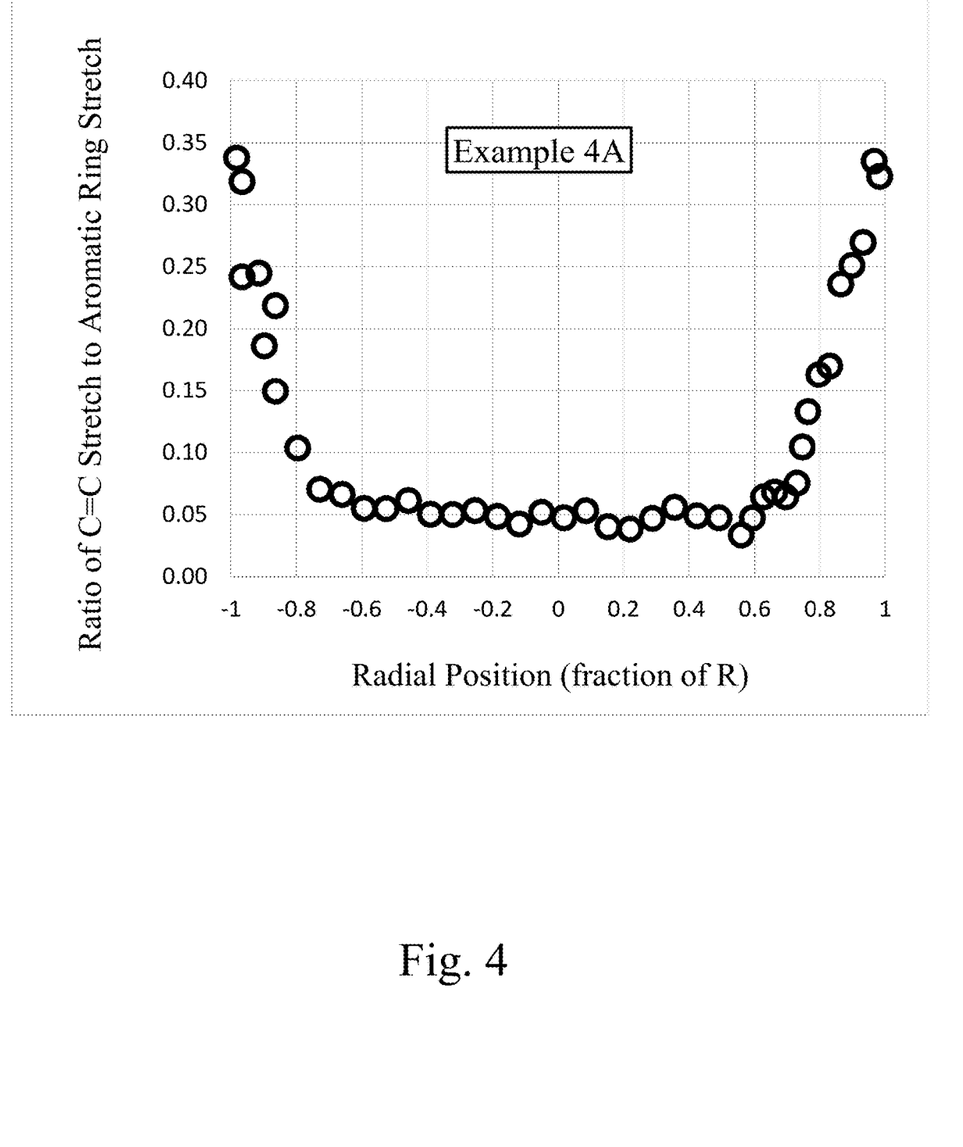
FIG. 4 shows the Raman spectroscopic analysis of a polymeric particle according to Example 4A.

Samples were prepared and Raman spectra were obtained at various points along a diameter of a bead as described above. PCC was the height of the Raman peak at 1635 cm$^{-1}$ due to stretching of carbon-carbon double bonds. PAR was the height of the Raman reference peak at 1000 cm$^{-1}$ due to stretching of the aromatic ring. The quotient V1=PCC/PAR characterizes the prevalence of double bonds within the polymer. FIG. 3 shows a plot of V1 versus position for Comparative Example 1B. FIG. 4 shows a plot of V1 versus position for Example 4B.

FIG. 4 shows that Example 4A has relatively high values of V1 at the edges of the bead in comparison to the middle of the bead. This means that Example 4A has a relatively high proportion of unreacted double bonds near the circumference of the bead in comparison to the middle of the bead.

In referring to FIGS. 3 and 4, "distance from the center of the bead" is considered herein to be an absolute value, regardless of the direction from the center of the bead. Thus a point having a value on the horizontal axis of negative 0.9 is considered to have distance from the center of 0.9*R, the same as a point at a value on the horizontal axis of positive 0.9.

The relative peak heights near the circumference of the bead as compared to the peak heights near the center of the bead were assessed as follows. The values of V1 were averaged for points at radial distance from the center of the bead of 0.8*R to R, and this average was labeled V1SHELL. Similarly, the values of V1 were averaged for points at radial distance from the center of the bead of 0 to 0.5*R, and this average was labeled V1CORE. Then the quotient is calculated:

$$VR = V1SHELL/V1CORE$$

which is the radial distribution factor for unreacted vinyl groups. It is contemplated that curves like FIG. 3 will have relatively low value of VR, while curves like FIG. 4 will have relatively high value of VR.

Using the Raman results, a similar assessment can be made using the ratio of the CD stretch to the CH stretch to yield RDFS, the radial distribution factor for swelling solvent.

In order to assess crush strength and osmotic stability, the polymeric beads were functionalized (i.e., had sulfonic acid groups attached) as described above.

The results of the testing were as follows:

| Example | VR | RDFS | Crush (g) | O.S. (% break) |
| --- | --- | --- | --- | --- |
| Comp. 1A | 1.08 | 1.07 | 518 | 23.2 |
| Comp. 1B | 1.19 | 1.63 | 531 | 14.6 |
| Comp. 2A | 2.06 | 1.62 | 1064 | 1.0 |
| Comp. 2B | 2.02 | 2.29 | 987 | 2.6 |
| 3A | 4.12 | 2.97 | 1888 | 0.4 |
| 3B | 4.08 | 4.50 | 1957 | 0.3 |
| 4A | 5.28 | 4.63 | 2606 | 0.2 |
| 4B | 5.81 | 2.65 | 2893 | 0.2 |

The Example polymers 3A, 3B, 4A, and 4B were all made by the method of the present invention, and all had VR greater than 3.5, while the comparative polymers had VR less than 2.1. The Example polymers also all had RDFS greater than 2.6, while the comparative polymers had RDFS less than 2.3. The Example polymers showed superior performance properties (i.e., crush strength and osmotic stability) compared to the comparative polymers.

Results of SEM-EDS testing of sulfonated polymeric beads. The beads tested were sulfonated resins made from the copolymers of Comparative Examples 2A and 2B and of Example 4A. In all samples, the SEM-EDS test results in an image that shows the presence of sulfur in a cross section of the bead through the center. Visual inspection of these images showed that sulfur is evenly distributed throughout the cross section of the particle. Also, the image may be analyzed digitally to produce a graph of sulfur content as a function of position along a diameter line of the cross section. Such a graph shows the sulfur content to be constant along the diameter line. These results shown that the distribution of sulfur is uniform throughout the bead. Thus any improved properties in the beads of the present invention are not due to any inhomogeneities in the distribution of sulfonic acid groups in the bead.

Results of NMR analysis on non-functionalized polymeric beads were as follows. The solvent was $CHCl_3$. When a comparative homogeneous bead was tested, one peak was observed at approximately 6.7 ppm, corresponding to solvent swollen into the bead, and a second peak was observed at approximately 7.2 ppm, corresponding to free solvent. When a sample of the present invention was tested, a free solvent peak at 7.2 ppm was observed as in the comparative sample, but in the inventive sample, the peak corresponding to solvent swollen into the bead was split into two peaks, one higher than 6.7 ppm and one lower than 6.7 ppm. It is considered that the two peaks above and below 6.7 ppm demonstrate that the imbibed solvent is present in two different environments. It is considered that one environment is the relatively highly crosslinked core and the other environment is the relatively lightly crosslinked shell.

Results of NMR analysis of sulfonated polymeric beads were as follows. The solvent was water. In the comparative sample, which is homogeneous, a free water peak was observed at approximately 4.7 ppm, and a peak at approximately 6.4 ppm due to water imbibed into the bead was observed. When a polymeric bead of the present invention was tested, the same free water peak at 4.7 ppm was observed, but the single peak at 6.4 ppm was replaced by a pair of peaks, one at lower ppm than 6.4 ppm and one higher than 6.4 ppm. It is considered that the two peaks above and below 6.4 ppm demonstrate that the imbibed solvent finds itself in two different environments. It is considered that one environment is the relatively highly crosslinked core and the other environment is the relatively lightly crosslinked shell.

The invention claimed is:

1. A polymeric bead having radius R wherein the polymer comprises 0.3% to 20% by weight, based on the weight of the polymer, of polymerized units of one or more multifunctional vinyl monomer and 80% to 99.7% by weight, based on the weight of the polymer, of polymerized units of one or more monofunctional vinyl monomer,
    (a) wherein the polymerized units of multifunctional vinyl monomer have radial distribution factor MR of 0.9 to 1.1, wherein MR=CMSHELL/CMCORE, wherein CMSHELL is the average concentration of polymerized units of multifunctional vinyl monomer located at a distance from the center of the bead of 0.8*R to R, and wherein CMCORE is the average concentration of polymerized units of multifunctional vinyl monomer located at a distance from the center of the bead of 0 to 0.5*R, and
    (b) wherein some of the vinyl groups in the polymerized units of multivinyl monomer are unreacted, and the unreacted vinyl groups have a radial distribution factor VR of 2.5 or higher, wherein VR is determined by a Raman spectroscopic measurement performed on the bead, wherein $$VR = V1SHELL/V1CORE,$$

wherein V1SHELL is the average of ratio V1 for measurements made at a distance from the center of the bead of 0.8*R to R, wherein V1CORE is the average of ratio V1 for measurements made at a distance from the center of the bead of 0 to 0.5*R, wherein V1=PCC/PAR, wherein PCC is the height of the Raman spectroscopic peak due to stretching of carbon-carbon double bonds, and PAR is the height of the Raman spectroscopic reference peak due to stretching of the aromatic ring at 1000 cm$^{-1}$.

2. The polymeric bead of claim 1, wherein the polymeric bead comprises a gel-type resin.

3. The polymeric bead of claim 1, wherein the monofunctional vinyl monomers comprise one or more styrenic monomer.

4. The polymeric bead of claim 1, wherein the multifunctional vinyl monomers comprise one or more styrenic monomer.

5. The polymeric bead of claim 1, wherein the polymer comprises 8% to 15% by weight, based on the weight of the polymer, of polymerized units of one or more multifunctional vinyl monomer and 85% to 92% by weight, based on the weight of the polymer, of polymerized units of one or more monofunctional vinyl monomer.

6. The polymeric bead of claim 1, having an average particle diameter of 50 μm or larger.

7. The polymeric bead of claim 1, having an average particle diameter of 100 μm or larger.

8. The polymeric bead of claim 1, having an average particle diameter of 200 μm or larger.

9. The polymeric bead of claim 1, having an average particle diameter of 400 μm or larger.

10. The polymeric bead of claim 1, having an average particle diameter ranging from 50 μm to 1,500 μm.

11. The polymeric bead of claim 1, having an average particle diameter ranging from 100 μm to 1,000 μm.

12. The polymeric bead of claim 1, having an average particle diameter ranging from 200 μm to 1,000 μm.

13. The polymeric bead of claim 1, having an average particle diameter ranging from 400 μm to 1,000 μm.

14. The polymeric bead of claim 1, wherein the monofunctional vinyl monomers comprise styrene.

15. The polymeric bead of claim 1, wherein the multifunctional vinyl monomers comprise divinylbenzene.

16. The polymeric bead of claim 1, wherein the monofunctional vinyl monomers comprise styrene and the multifunctional vinyl monomers comprise divinylbenzene.

* * * * *